G. A. HOYT.
Seed-Dropper.
No. 704.
Patented Apr. 21, 1838.
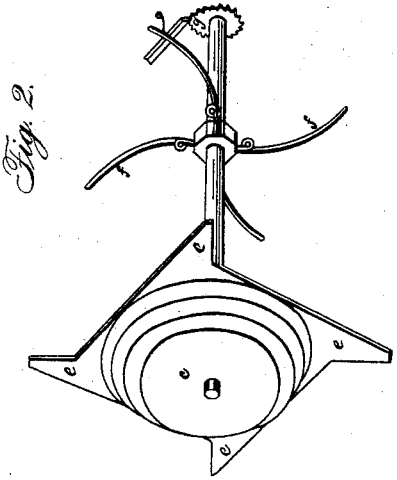
Fig. 2.
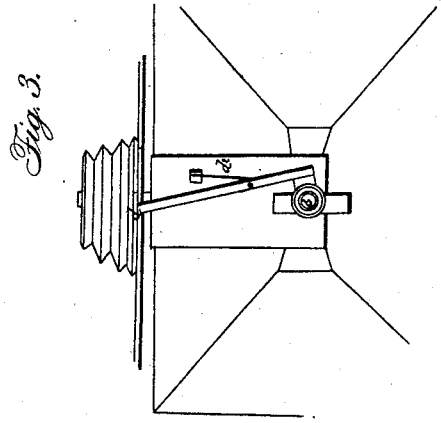
Fig. 3.
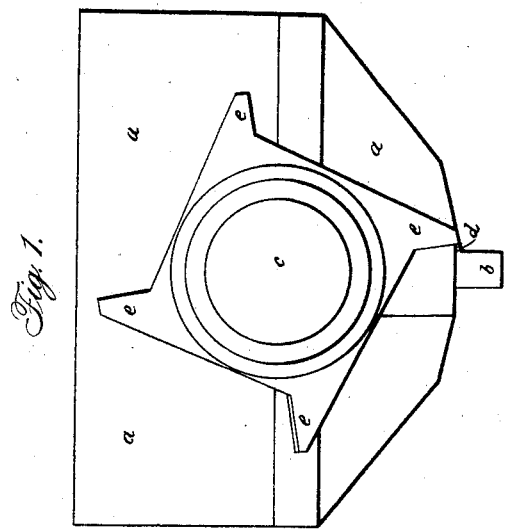
Fig. 1.
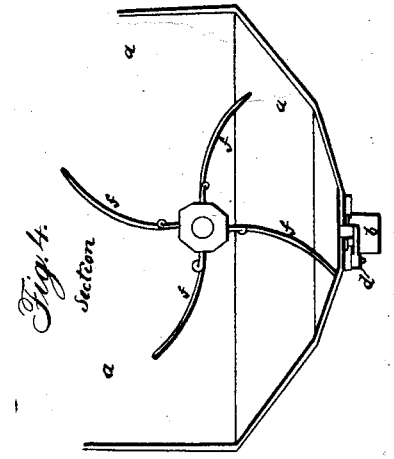
Fig. 4. Section

UNITED STATES PATENT OFFICE.

GEO. A. HOYT, OF ALBANY, NEW YORK.

IMPROVEMENT IN THE DRILL-MACHINE FOR SOWING OR PLANTING SEED.

Specification forming part of Letters Patent No. 704, dated April 21, 1838.

*To all whom it may concern:*

Be it known that I, GEORGE A. HOYT, of Albany, in the State of New York, have invented certain Improvements in the Machine for Planting or Sowing Seeds for Horticultural and Agricultural Purposes, well known under the name of a "Drill-Machine;" and I do hereby declare that the following is a full and exact description thereof.

I construct a vehicle which shall run upon a wheel or upon wheels, which vehicle may be in the form of a barrow and be driven by hand; or for purposes requiring it the instrument may be made longer, and may be used by horse or other power. This vehicle is to sustain a hopper which is to receive the seed to be planted or sown, there being proper contrivances for regularly disseminating the same in a manner to be now described.

Figure 1 in the accompanying drawings is a side view of the machine so far as the same is necessary to be shown to exhibit the nature of my improvement, the wheel or wheels being omitted, as is also a share for opening a furrow, which may be employed with this as with other similar machines, as likewise may be a hoe or apparatus for covering the grain to be sown. The box or hopper $a\ a\ a$ contains the seed, which is to be dropped through a tube, $b$, under the center of the hopper. A whirl, $c$, receives a band from the running-wheel of the machine to turn a shaft, with arms within the hopper. A sliding valve closes the lower end of the tube through which the seed is to be dropped, $d$ being the end of a lever which opens this valve. The arms $e\ e\ e\ e$, which are attached to the whirl $c$, by coming into contact with lever $d$, open the valve or shutter, which is closed by a spring, $d^2$.

Fig. 2 represents the shaft which is carried by the whirl $c$. Upon the middle of this shaft there are four or any other convenient number of arms, $f\ f$, which are made of steel or other elastic material. These are of such length as to come into contact with the bottom of the hopper, and consequently pass over the mouth of the tube through which the seed is to pass. Their ends enter this tube with a slight degree of force, but which is sufficient to impel the seed downward at the moment the valve below is opened by the arms $e\ e$, while at the same time they clear away such superfluous seed as might otherwise fall through. A ratchet-wheel, $g$, acted on by a pawl, prevents all back motion of the shaft.

Fig. 3 represents a view of the bottom of the machine, and Fig. 4 a section of Fig. 1, but in a position the reverse of Fig. 1.

There are tubes made of different sizes, to be adapted to the lower side of the hopper, according to the nature of the seed. The quantity dropped is also regulated by varying the size of the whirl and the number of the arms $e\ e$ and $f\ f$.

I do not intend to confine myself to any particular form or construction of the machine generally, but to use any of the known modes of proceeding in these points.

What I claim as my invention is—

The use of the spring-arms attached to the horizontal shaft and revolving within the seed box or hopper, so as to pass over and act upon the seed contained in the tube through which it is to fall, and at the same time clearing away the seeds from the mouth of said tube, in the manner herein described.

GEO. A. HOYT.

Witnesses:
  A. J. COLVIN,
  E. LIVINGSTON.